Feb. 6, 1934.  E. VON MALTITZ  1,945,839
FILTERING APPARATUS
Filed April 25, 1932
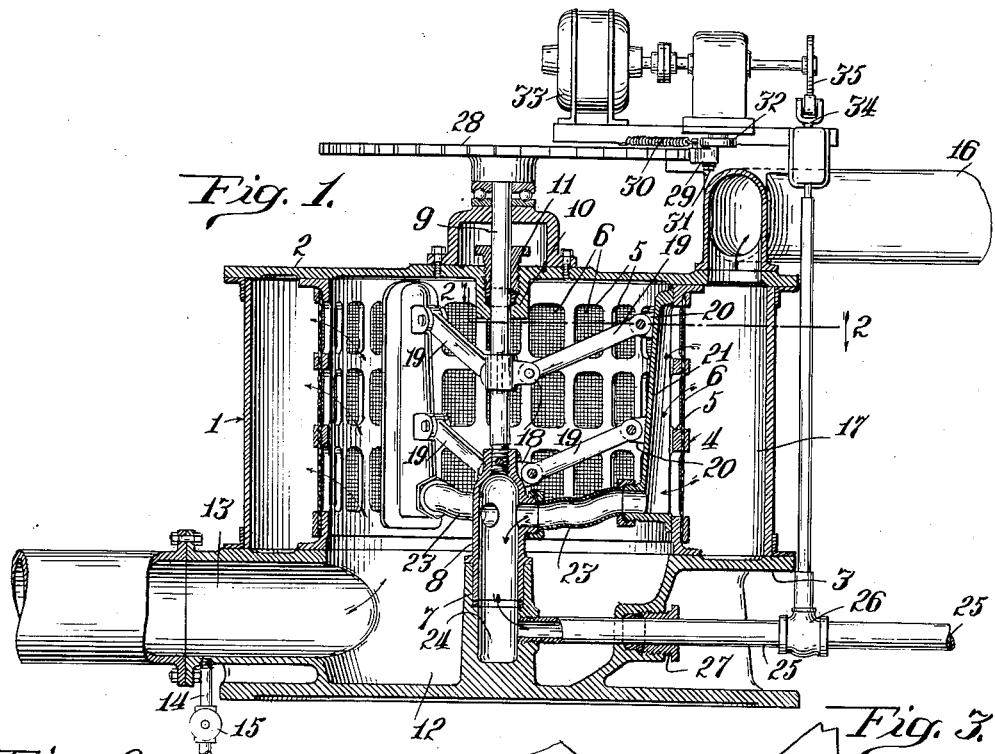
Fig. 1.
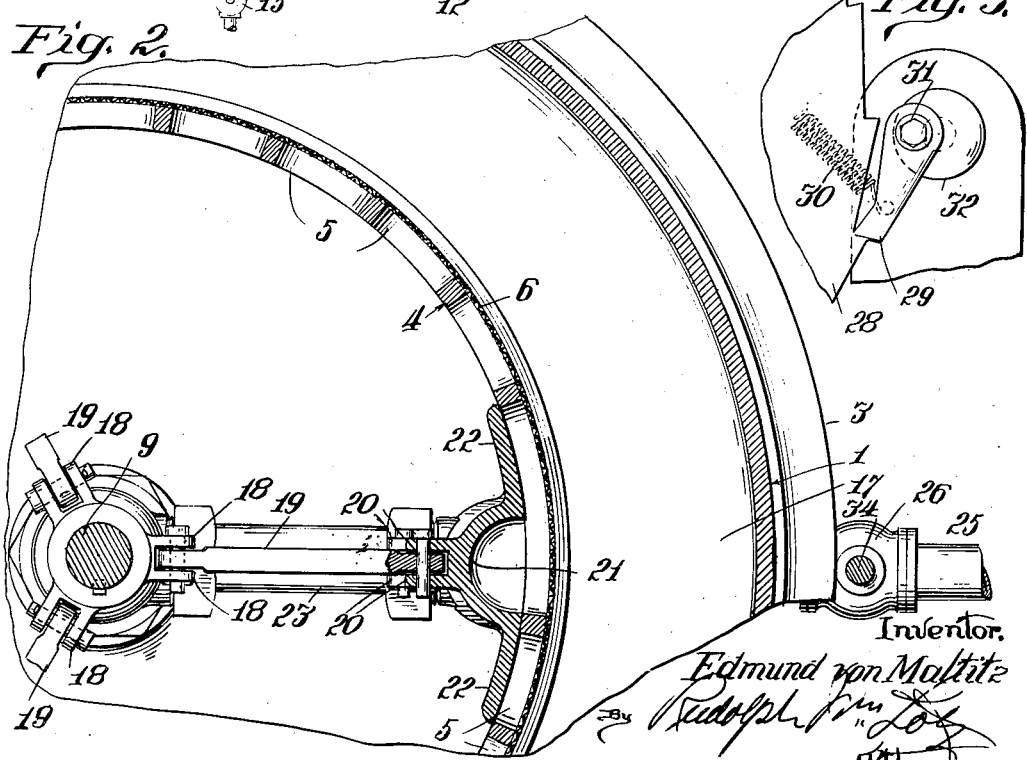
Fig. 2.
Fig. 3.
Inventor.
Edmund von Maltitz
By Rudolph von Loy
Attorney.

Patented Feb. 6, 1934

1,945,839

UNITED STATES PATENT OFFICE 1,945,839

FILTERING APPARATUS

Edmund von Maltitz, Chicago, Ill.

Application April 25, 1932. Serial No. 607,341

4 Claims. (Cl. 210—152)

This invention relates to the art of self cleaning fluid filtration apparatus.

The main object of the present invention is to provide a filtering apparatus for the purpose specified which is relatively simple and cheap, and which will occupy a relatively small space compared to its capacity in cubic feet per minute and which, furthermore, is substantially self-cleaning in nature in order to enable it to be maintained in continuous operation for a very appreciable period of time.

A specific object of the invention is to arrange the flow of fluid to be filtered and flow of filtered fluid in such a manner and direction as to preclude the possibility of any pollution of the filtered fluid by admixture of backwash fluid with the same.

A further specific object of the invention is to provide back-wash mechanism which includes means for maintaining close but yielding contact of the back-wash channel members with the surface of the cylinder opposed to the same so as to take up wear automatically and guard against leakage between the said opposed elements of the apparatus.

Suitable embodiments of the invention are illustrated in the accompanying drawing, wherein:

Fig. 1 is a central vertical section through a filtering apparatus constructed in accordance with the invention, and having certain parts thereof shown in elevation.

Fig. 2 is a fragmentary plan view of the same on an enlarged scale on the line 2—2 of Fig. 1.

Fig. 3 is a fragmentary plan view showing a part of the operating mechanism of the apparatus.

The apparatus of the present invention includes a cylindrical casing 1 equipped with a cover member 2 and a base member 3 which are suitably secured to the member 1 to provide fluid tight joints.

Within the casing 1, which may be of any contour other than cylindrical, if desired, there is mounted a cylinder 4 which is equipped with a series of annular rows of spaced apart openings 5, and which is externally covered with a continuous foraminous screen or strainer 6 of a sufficiently fine mesh to meet the requirement of the fluid to be treated or filtered.

The said cylinder 4 is preferably machined internally and externally to provide smooth accurate cylindrical surfaces penetrated by said openings or slots 5.

The base member 3 is equipped with a bearing 7 for the lower hollow end portion 8 of a shaft 9 which is journalled in a bearing 10 in the cover plate 2, said bearing 10 being equipped with a stuffing-box 11 to provide a fluid tight joint about said shaft. The said hollow end portion 8 of said shaft 9 is also so mounted in the bearing 7 as to provide a substantially fluid tight joint around the same.

The said base member 3 includes a substantially central chamber 12 which communicates at its upper end with the cylinder 4 to feed the latter, the supply pipe 13 entering said chamber 12 at one side of said base. A drain pipe 14 equipped with a valve 15 communicates with the pipe 13 for use in draining the casing 1 for purposes of cleaning at intervals or for the purpose of effecting repairs. The discharge pipe 16, which communicates with the annular chamber 17 between the casing 1 and the cylinder 4, is disposed preferably to take water from a point at or adjacent to the top of said chamber 17.

The shaft 9 is equipped with a plurality of pairs of lugs 18, in which links 19 are pivotally engaged at one end each. The said links are arranged in pairs of which three sets are shown in the accompanying drawing as merely exemplary of a plurality of sets thereof, and are pivotally secured at their other ends between pairs of lugs 20 disposed upon the inner faces of drain members 21 equipped with arcuate side flanges 22 to hug the inner surface of the cylinder 4. The said drain members 21 are substantially of elongated, truncated cone-shape, being closed at their ends and being of a diameter equal to the width of the openings 5 in the cylinder 4, the closed end portions thereof being disposed above and below the zone occupied by said openings 5 between the ends of the said cylinder 4.

In the instance illustrated in Fig. 1, the said links 19 extend at an upward incline from the lugs 18 to the lugs 20 and cooperate with the weight of the member 21 to cause the flanges 22 and the upper and lower wall portions of said members 21 to hug the inner surface of the cylinder 4 by gravity, and, therefore, may be deemed to constitute means for maintaining the said members 21 yieldingly in contact with the inner surface of said cylinder 4, it being obvious that other means for providing such a yielding engagement or pressure may be substituted for said links without departure from the invention.

The lower ends of the drain members 21 are connected with the hollow lower end portion 8 of the shaft 9 by means of flexible hose connections 23.

In the lower end of the bearing 7, a pocket 24 is provided which connects with one end of a drain pipe 25 equipped with a valve 26, and which passes through a stuffing-box 27 in the wall of the base 3 bordering the pocket or chamber 12 in the latter.

The said shaft 9 is equipped with a ratchet wheel 28 having a number of teeth corresponding in number with the vertical rows of openings 5 in the said cylinder 4. This ratchet wheel 28 is engaged by a pawl 29 held in engagement therewith by means of a spring 30. The said pawl is pivotally mounted upon a crank-pin 31 of a shaft or other rotary member 32 which is suitably geared to a motor 33 or other source of power for slow rotation. The valve 26 of the pipe 25, which, for example, may be a gate-valve, is equipped with a stem 34 for reciprocation or other movement requisite to effect opening and closing of the said valve, and said stem is suitably secured to a rotatable member 35 which is also geared to the motor 33 or other source of power for rotation in synchronism with the ratchet wheel 28 for causing the valve 26 to be open during each period of rest of the ratchet wheel 28 after an actuation thereof by said pawl 29 and to be closed during intervals of movement of said ratchet wheel 28 responsively to actuation thereof by said pawl 29.

The operation of said apparatus is as follows: Water or other fluid to be clarified flows into the chamber 12 from the pipe 13 and enters and preferably fills the said cylinder 4 and flows thence through the screen 6 opposed to the openings 5 into the chamber 17 and thence is discharged through the discharge pipe 16. The sedimenta carried by the water are strained out of the same by means of said screen 6 which will become more or less clogged thereby within a relatively short time. The water entering the said cylinder may, for example, be under a pressure of twenty pounds per square inch, and, consequently, under somewhat less pressure within the chamber 17. The said chamber 17 communicates with the said drain members 21 through the openings 5 which are opposed to the said drain members 21, and thus the water contained in the chamber 17 will flow reversely through the screen 6 opposed to the openings which communicate with said drain members 21, thus back-washing the said screen areas and clearing them of the sedimenta clogging or adhering to the same. This back-washed water with the sedimenta will flow by gravity through the flexible hose members 23 into the hollow end portion 8 of the shaft and thus into the pocket 24 and pipe 25 and pass the valve 26 during the intervals that said valve is open. At each actuation of the ratchet wheel 28, the several drain members 21 will become opposed to and disposed in register with the number of series of vertical openings 5 corresponding to the number of said members 21, and during the interval of movement of said ratchet wheel, some back-flow into the same will occur, but such back-flow is obviously interrupted by the fact that the valve 26 is then closed, so that the actual effective back-wash takes place only during intervals of rest of said members 21, as aforesaid.

Obviously, the number of members 21 to be used will vary in accordance with the conditions presented in individual instances and the rapidity of operation of the ratchet wheel 28 will also be determined by said conditions.

It will be noted that the bearing (7) is disposed in that part of the casing which is filled with fluid to be filtered so that, in the event of leakage due to the wear on said bearing and the portion of the shaft journalled therein, there can be no contamination of the filtered fluid as is the case with filtering apparatus of this general type now commonly used. Owing to the fact that said bearing is exposed to the entrance of gritty particles carried by the fluid to be filtered and by the backwash fluid, this leakage is apt to occur before the apparatus has been in use very long.

I claim as my invention:

1. A filtration apparatus comprising a casing having an inlet port for fluid to be filtered, an outlet port for filtered fluid, a cylindrical filtering member disposed between said ports and having a port communicating with the intake port of the casing, a shaft disposed axially of the said cylinder and having a hollow end portion, a back wash member opposed to and in close contact with the said cylinder and engaged with said shaft and having an elongated channel opposed to said cylinder, a tubular conduit connecting said member with the hollow portion of the said shaft, a bearing in which the hollow portion of the said shaft is journalled, a discharge pipe connected with said bearing and communicating with said hollow portion of the shaft, said bearing being disposed for immersion in the fluid to be filtered disposed within the casing, and power actuated mechanism for intermittently rotating said shaft a distance substantially equal to the width of the said channel.

2. A filtration apparatus comprising a casing having an intake port in its lower end and a discharge port at another point, an annular filtering member rigidly mounted within said casing and having an opening communicating with the intake port of the casing and arranged to cause the entering fluid to pass through said member to reach the discharge port, a shaft having a hollow end portion disposed axially of the annular member, a backwash member disposed longitudinally of and in close contact with the filtering member substantially throughout the length of the latter and having a longitudinal recess opposed to the filtering member, a conduit connecting said recess with the hollow end of the said shaft arms connecting said backwash member with the said shaft, a bearing having a discharge port communicating with said hollow portion of the shaft and disposed within the portion of the casing containing fluid to be filtered and means for rotating said shaft.

3. A filtration apparatus comprising a casing having an intake port in its lower end and a discharge port at another point, an annular filtering member rigidly mounted within said casing and having an opening communicating with the intake port of the casing and arranged to cause the entering fluid to pass through said member to reach the discharge port, a shaft having a hollow end portion disposed axially of the annular member, a backwash member disposed longitudinally of and in close contact with the filtering member substantially throughout the length of the latter and having a longitudinal recess opposed to the filtering member, means connecting said backwash member with said shaft for rotation therewith, said means arranged to cause a yielding pressure of said backwash member against said annular member, a flexible conduit connecting said recess of said backwash member with the hollow portion of the said shaft, a bearing having a discharge port communicating with said hollow portion of the shaft and disposed within the portion of the casing containing fluid to be filtered and means for rotating said shaft.

4. A filtering apparatus comprising a casing having intake and discharge ports, an annular member rigidly mounted in said casing on a vertical axis and arranged so that all fluid entering said casing must pass through the peripheral wall of the said member to reach the discharge port of the casing, said member being substantially inflexible and foraminous and equipped with filtering means through which said fluid must pass, a backwash member having a longitudinal recess opposed to said foraminous member and extending over the entire length of the portion thereof equipped with said filtering means, a shaft extending axially of said member and having a hollow portion connected with said recess of said backwash member for draining off backwash water entering said recess, a bearing for said hollow portion of said shaft and having a drain opening communication with the hollow portion of said shaft, said bearing disposed out of communication with clarified fluid contained in said casing externally of the annular member, a plurality of arms connecting the backwash member with said shaft and pivotally connected at their ends with said shaft and said backwash member for movement on horizontal axes, said arms arranged to cause said backwash member to be maintained by gravity in firm contact with said annular member during rotation of said shaft and corresponding travel of the backwash member and means for rotating said shaft.

EDMUND von MALTITZ.